US009124958B2

(12) United States Patent
Coroy

(10) Patent No.: US 9,124,958 B2
(45) Date of Patent: Sep. 1, 2015

(54) MULTIBAND RECONFIGURABLE OPTICAL ADD-DROP MULTIPLEXING WITH CONVERGED SIGNAL ADDITION AND REMOVAL

(75) Inventor: Trenton Gary Coroy, Steinbach (CA)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 324 days.

(21) Appl. No.: 13/805,775

(22) PCT Filed: Feb. 24, 2012

(86) PCT No.: PCT/US2012/026505
§ 371 (c)(1),
(2), (4) Date: Dec. 20, 2012

(87) PCT Pub. No.: WO2013/126069
PCT Pub. Date: Aug. 29, 2013

(65) Prior Publication Data
US 2014/0003811 A1 Jan. 2, 2014

(51) Int. Cl.
*H04J 14/02* (2006.01)
*H04Q 11/00* (2006.01)
(52) U.S. Cl.
CPC .......... *H04Q 11/0003* (2013.01); *H04J 14/021* (2013.01); *H04J 14/0204* (2013.01); *H04J 14/0205* (2013.01); *H04J 14/0213* (2013.01)
(58) Field of Classification Search
CPC . H04J 14/0204; H04J 14/0205; H04J 14/021; H04J 14/0213
See application file for complete search history.

(56) References Cited

U.S. PATENT DOCUMENTS

| 7,706,688 | B2 | 4/2010 | Boudreault et al. | |
|---|---|---|---|---|
| 8,009,986 | B2 | 8/2011 | Chang et al. | |
| 2002/0131118 | A1 | 9/2002 | Chiaroni et al. | |
| 2002/0149818 | A1* | 10/2002 | Tomofuji et al. | 359/124 |
| 2004/0252996 | A1* | 12/2004 | McNicol | 398/79 |
| 2009/0034974 | A1* | 2/2009 | Grubb | 398/68 |
| 2009/0232497 | A1* | 9/2009 | Archambault et al. | 398/50 |
| 2010/0202778 | A1* | 8/2010 | Wisseman | 398/83 |
| 2011/0116790 | A1* | 5/2011 | Sakauchi et al. | 398/5 |

OTHER PUBLICATIONS

International Search Report and Written Opinion from International Application No. PCT/US2012/026505 mailed Feb. 24, 2012.

(Continued)

*Primary Examiner* — Shi K Li
(74) *Attorney, Agent, or Firm* — Brundidge & Stanger, P.C.

(57) ABSTRACT

Various architectures for implementing multi-band reconfigurable optical add-drop multiplexing with converged signal addition and removal are provided. Under the described architectures, channel isolation is improved, performance requirements for switching elements are lower, and it may be possible to reduce the number of line side switching elements by a factor of two. The use of additional spectrum per fiber with the described architectures results in fewer required ports per switching element. The degree of contention at signal addition and removal is also reduced. Moreover, the architectures support optical networks with higher capacities per fiber and therefore conserve fiber assets. The architectures are modular in nature, allowing a network to be deployed in a single-band setting and later upgraded to support multiple bands.

28 Claims, 9 Drawing Sheets

(56) References Cited

OTHER PUBLICATIONS

"OPTO-VLSI Processing for Reconfigurable Optical Device" by Chung-Kiak Poh, et al, Dec. 2005.

"Multi-degree ROADM Based on Wavelength Selective Switches: Architectures and Scalabity", by R. Shankar, et al.

Colbourne, P., and Collings, B., "ROADM Switching Technologies," The National Fiber Optic Engineers Conference Optical Fiber Communication Conference and Exposition (OFC/NFOEC), pp. 1-5 (Mar. 6-10, 2011).

"Finisar Tech Brief," p. 1, Finisar Corporation (2011).

Zhang, X. J., et al., "Bridge - and - Roll Demonstration in GRIPhoN (Globally Reconfigurable Intelligent Photonic Network)," National Fiber Optic Engineers Conference, 2010 Conference on (OFC/NFOEC Optical Fiber Communication (OFC), pp. 1-3 (Mar. 21-25, 2010).

* cited by examiner

MULTIBAND RECONFIGURABLE OPTICAL ADD-DROP MULTIPLEXING WITH CONVERGED SIGNAL ADDITION AND REMOVAL

CROSS-REFERENCE TO RELATED APPLICATION

This Application is the National Stage filing under 35 U.S.C. §371 of PCT Application Ser. No. PCT/US12/26505 filed on Feb. 24, 2012. The disclosure of the PCT Application is hereby incorporated herein by reference in its entirety.

BACKGROUND

In fiber-optic communication, an optical add-drop multiplexer (OADM) is an optical node used in wavelength-division multiplexing (WDM) systems for multiplexing and routing different channels of light into or out of a single mode fiber. Typically, an OADM has the capability to add one or more new wavelengths to an existing multi-wavelength WDM system, and to drop, or remove, one or more wavelengths from the multi-wavelength WDM system by passing the dropped signals to another network path. A reconfigurable optical add-drop multiplexer (ROADM) is a type of OADM that enables an operation to remotely switch traffic from a WDM system at the wavelength layer without manual intervention.

The complexity of ROADMs in optical networking continues to increase, and has placed considerable strain on the requirements for switching elements such as wavelength selective switches (WSSs). However, increases in the number of ports and other features supported by a 1×N WSS impact isolation performance, and multiple switches become necessary to meet channel isolation requirements in ROADM. For example, broadcast and select architectures are expected to migrate to route and select, doubling the number of WSSs required on the line side of the ROADM, increasing complexity and cost. Architectures that provide a way to reduce the number of switching elements per ROADM degree are therefore of particular interest.

On the other hand, relentless growth in communications traffic continues to challenge optical network capacity. Additional bands of spectrum need to be considered eventually as a means for increasing transmission capacity per fiber. Indeed, early work on more extreme approaches such as the use of multi-core fibers is underway. The use of multiple spectrum bands conserves fiber assets, which is particularly important where fiber is scarce, where premium fibers are deployed and used, and where fibers are leased.

In optical networks today a single-band approach, e.g., C band or a somewhat wider "extended C band", is preferred, particularly for ROADM-centric architectures. The addition of further bands is possible, but the deployment of an essentially parallel set of equipment for one or more other bands, e.g., L band, on an existing fiber is typically less attractive than the deployment of a parallel set of C band equipment on a new fiber, especially when the fiber is readily available. For example the equipment required for other bands is often more expensive or commercially unavailable. Viable architectures that reduce the cost of multi-band equipment in comparison to equivalent single-band solutions are expected to become very important but are not yet available.

SUMMARY

Described herein are systems, apparatuses, methods, and techniques related to multi-degree reconfigurable optical add-drop multiplexing. Various architectures for a multi-band ROADM with converged signal addition and removal are provided. The use of multiple bands provides a number of advantages over a same size ROADM in a single band. Channel isolation is improved. The performance requirements for switching elements, such as WSSs, are lower. The number of line-side switching elements may be reduced by a factor of two. The proposed architectures also relieve the degree of contention at signal addition and removal, thus providing operational advantage and further reductions in complexity and cost of switching and routing.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
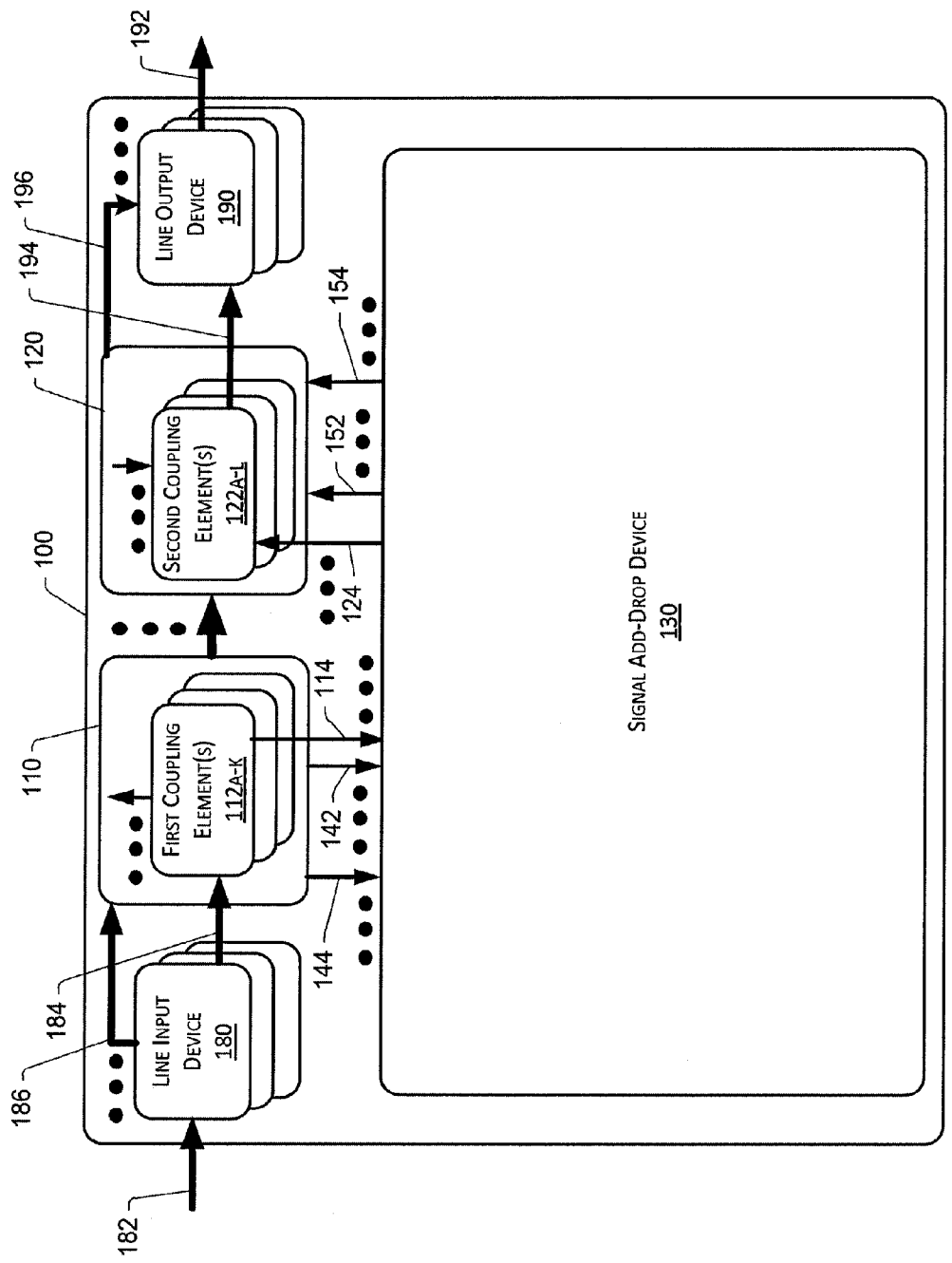
FIG. 1 shows an example apparatus for generally implementing multi-band reconfigurable optical add-drop multiplexing with converged signal addition and removal.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

Described herein are architectures related to multi-band reconfigurable optical add-drop multiplexing with converged signal addition and removal. Each apparatus described below embodies a respective architecture for implementing multi-band reconfigurable optical add-drop multiplexing with converged signal addition and removal. The architectures are able to support various next-generation ROADM requirements, including colorless, directionless, contentionless and gridless, or flexible-grid, routing. Colorless and directionless functionality refers to the ability to route communications between wavelength-tunable transmitters and receivers to any line direction on any available wavelength. Gridless functionality is supported by various switchable coupling element technologies and, as necessary, by receiver filters and tunable transmitters.

Contentionless routing refers to the ability to add and drop, or remove, multiple instances of channels occupying the same wavelength spectrum at the same ROADM node. The number of such instances that can be supported on either signal addition ports (for adding signals) or signal removal ports (for dropping signals) is referred to as the "contentionless degree" of the ROADM. For a ROADM to be "contentionless", the contentionless degree needs to be equal to or greater than the degree of the ROADM. For ROADM nodes of high degree, support for fully contentionless signal add/drop becomes extremely expensive due to factors including, for example, the amount and complexity of additional switching required, increased port count requirements for existing switch elements (e.g., wavelength selective switches), and for some architectures a need to provision a larger number of available transponders in preparation to quickly turn up add/drop traffic.

Exemplary Architecture and Apparatus

FIG. 1 shows an example apparatus 100 for generally implementing multi-band reconfigurable optical add-drop multiplexing with converged signal addition and removal.

As depicted, apparatus 100 includes one or more line input devices 180, a distributing device 110, a combining device 120, one or more line output devices 190, and a signal add-drop device 130. Apparatus 100 may accept a plurality of input signals from one or more line inputs 182, drop one or more of the accepted input signals, add one or more signals, and output a plurality of output signals at one or more line outputs 192.

A frequency or wavelength band is a continuous range of spectrum which may support one or more optical signal channels such as, for example, traditional ranges such as C band and L band, and so forth. For example, a C-band ROADM may even utilize multiple bands, each band consisting of a portion of C band. However, a reduction in the size of the spectral bands can result in an increase in the number of required line-side switching elements. Furthermore, many of the advantages described herein assume an increase in the amount of spectrum utilized, such as for example the case of a ROADM for C band and L band as opposed to a ROADM for C band only. In the embodiments described herein line input and output devices are described which separate and combine groups of signals. For simplicity these devices are described as separating and combining bands. Additional band splitting and/or band combining devices are described in certain embodiments as well. However, it is understood that these devices may alternately separate and combine groups of signals each comprising multiple non-contiguous bands of spectrum. A simple example of such an implementation is the use of interleaver filters such that groups of odd channels and even channels are separated and combined.

One or more line input devices 180 may accept a plurality of input signals from one or more line inputs 182. Each line input device 180 may output a plurality of input signals as a plurality of bundles of input signals, including a bundle of first input signals 184 of a first wavelength band and a bundle of second input signals 186 of a second wavelength band. Although the one or more line input devices 180 as well apparatus 100 may accept and output signals of two or more wavelength bands, the examples provided herewith use signals of two wavelength bands, the first wavelength band and the second wavelength band, for simplicity in illustration and in the interest of brevity. It is understood that embodiments of the present disclosure are not limited thereto.

Distributing device 110 may accept one or more bundles of first input signals 184 and one or more bundles of second input signals 186, as well as any additional bundles of input signals corresponding to additional wavelength bands, from one or more line input devices 180. Distributing device 110 may further distribute at least some of the accepted signals into a plurality of distributed groups of signals.

Distributing device 110 may include one or more first coupling elements 112a-k. Each of first coupling elements 112a-k may include at least one input port to accept a respective bundle of the input signals. Each of first coupling elements 112a-k may also include a plurality of output ports to provide groups of signals, which may also be called signal groups hereinafter. Each of first coupling elements 112a-k may accept a plurality of input signals and distribute at least some of the accepted signals into a plurality of signal groups. In general a group of signals may include zero, one, or more than one signal depending on the details of the implementation and how the apparatus 100 is configured. In some cases an input signal may be distributed to multiple output signal groups. For example, first coupling element 112a may accept the bundle of first input signals 184, of the first wavelength band, and provide at least some of the accepted input signals as a respective plurality of groups of signals of the first wavelength band. Similarly, first coupling element 112b may accept the bundle of second input signals 186, of the second wavelength band, and provide at least some of the accepted input signals as a respective plurality of groups of signals of the second wavelength band. In at least one embodiment, one or more of first coupling elements 112a-k may include a wavelength selective switching element.

Combining device 120 may accept at least some of the distributed groups of signals from distributing device 110 and optionally one or more added signal groups. Combining device 120 may combine at least some of the accepted signals, and output one or more bundles of first output signals 194 and one or more bundles of second output signals 196, as well as any additional bundles of output signals corresponding to additional wavelength bands.

Combining device 120 may include one or more second coupling elements 122a-l. Each of second coupling elements 122a-l may include a plurality of input ports which may be coupled to accept respective groups of signals, including at least some of the groups of signals provided by respective first coupling elements 112a-k and optionally one or more added signal groups 124. Each of second coupling elements 122a-l may also include at least one output port to output at least some of the accepted signals as a bundle of output signals. For example, second coupling element 122a may accept signal groups of the first wavelength band, including a distributed signal group provided by first coupling element 112a, optionally including one or more additional distributed signal groups, and optionally including one or more added signal groups, and combine at least some of the accepted signals into a bundle of first output signals 194. Similarly, second coupling element 122b may accept signal groups of the second wavelength band, including a distributed signal group provided by first coupling element 112b, optionally including one or more additional distributed signal groups, and optionally including one or more added signal groups, and combine at least some of the accepted signals into a bundle of second output signals 196. In at least one embodiment, one or more of second coupling elements 122a-l may include a wavelength selective switching element.

A number of the groups of signals provided by each of first coupling elements 112a-k may be output to, and accepted by, one or more of second coupling elements 122a-l. Likewise, a number of the groups of signals accepted by each of second coupling elements 122a-l may be accepted from, and provided by, one or more of first coupling elements 112a-k.

One or more line output devices 190 may accept one or more bundles of first output signals 194 of the first wavelength band from the combining device 120. The one or more line output devices 190 may further accept one or more bundles of second output signals 196 of the second wavelength band. The one or more line output devices 190 may provide a plurality of output signals to one or more line outputs 192. Although line output devices 190 as well apparatus 100 may accept and output signals of two or more wavelength bands, the examples provided herewith use signals of two wavelength bands, the first wavelength band and the second wavelength band, in the interest of brevity. It is understood that embodiments of the present disclosure are not limited thereto.

Signal add-drop device 130 may accept one or more signal groups from distributing device 110. For example, signal add-drop device 130 may accept one or more distributed groups of signals 114 of the first wavelength band from first coupling element 112a as well as one or more distributed groups of signals 142 of the first wavelength band from one or more other first coupling elements 112b-k. Signal add-drop device 130 may further accept one or more distributed groups of signals 144 of one or more other wavelength bands, e.g., the second wavelength band, from distributing device 110. At least some of the accepted signals may be dropped and passed to another network path. For example, one or more of the accepted signals may be received by the signal add-drop device 130 or by one or more other devices coupled to the signal add-drop device 130. Additionally, signal add-drop device 130 may provide at least one added signal group to the combining device 120. For example, signal add-drop device 130 may provide one or more added signal groups 124 of the first wavelength band to second coupling element 122a as well as one or more added signal groups 152 of the first wavelength band to one or more other second coupling elements 122b-l. Signal add-drop device 130 may further provide one or more other added signals 154 of one or more other wavelength bands, e.g., the second wavelength band, to combining device 120. For example, one or more of the provided signals may be transmitted by the signal add-drop device 130 or by one or more other devices coupled to the signal add-drop device 130.

Apparatus 100 may be a multi-band ROADM with converged signal addition and removal. Line side routing for each band is done in parallel. The banded architecture can improve isolation and reduce the performance requirements for first coupling elements 112a-k and second coupling element 122a-l, potentially allowing the use of switching for either first coupling elements 112a-k or second coupling element 122a-l instead of both first coupling elements 112a-k and second coupling element 122a-l. This advantageously cuts the number of line side switching elements required in half. In addition to the direct cost benefit provided by the architecture represented by apparatus 100, optical signals routed through apparatus 100 pass through half the number of switching elements, thus reducing signal degradation due to effects such as channel narrowing. With fewer cascaded switching elements optical signal reach being extended, the need for expensive regeneration is reduced and more ROADM nodes can be supported along a given optical path.

The bands are recombined in the signal add-drop device 130, and therefore support of full colorless and directionless functionality is retained. When this architecture is applied utilizing additional spectrum per fiber, e.g., in comparison to a single band case, it offers significant advantage in terms of contention. Since there are fewer channels routed at a common wavelength and channels are spread over more spectrum, the potential for contention is reduced. Fewer contentionless degrees, with less complicated and less expensive switching, will be required to achieve a fully contentionless ROADM. For example, the ports on line side coupling elements and/or signal addition/removal side coupling elements may be decreased, and the number of signal addition/removal coupling elements required may be reduced.

Figure 2:
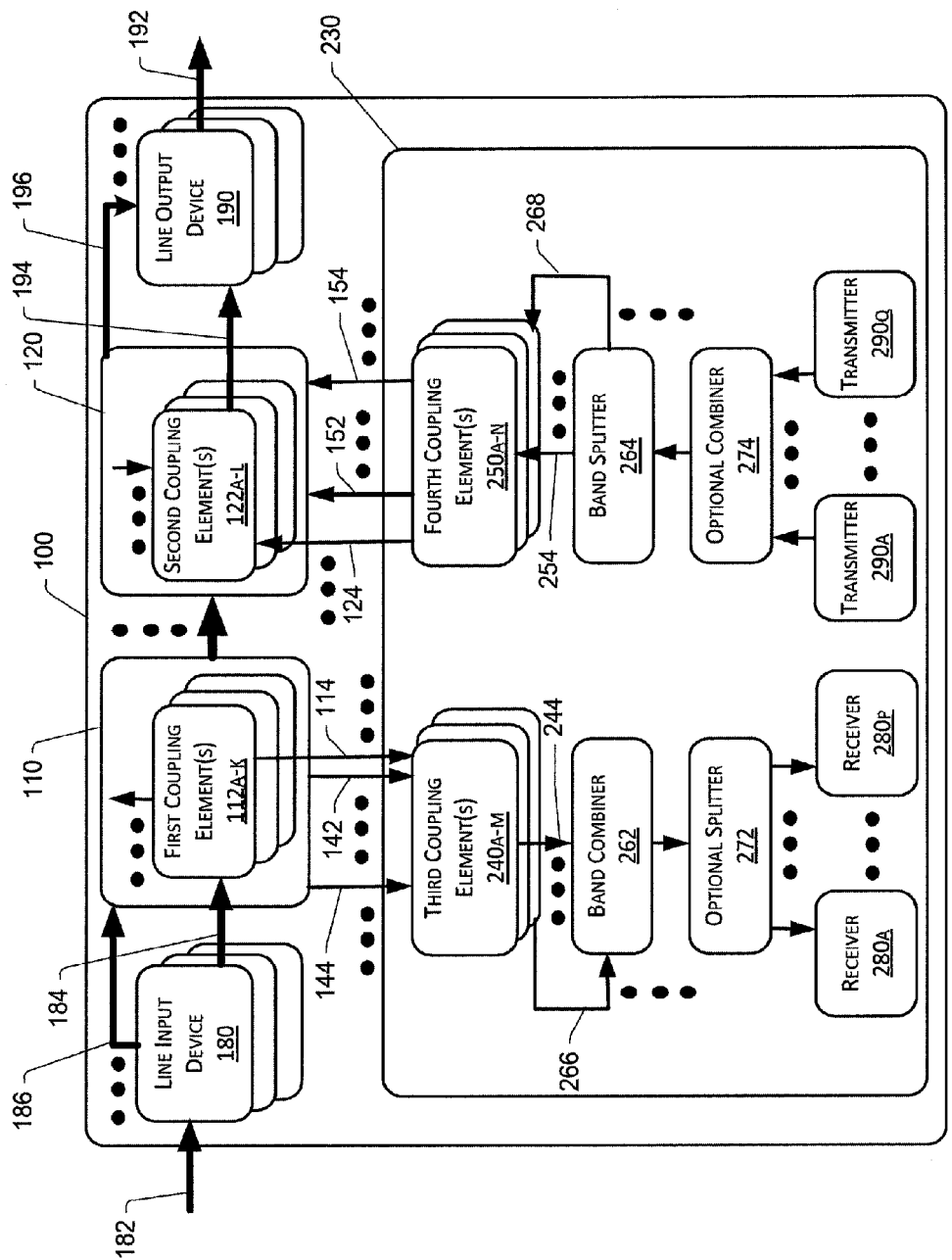
FIG. 2 shows an example apparatus for implementing at least one embodiment of multi-band reconfigurable optical add-drop multiplexing with converged signal addition and removal.

FIG. 2 shows an example apparatus 200 for implementing at least one embodiment of multi-band reconfigurable optical add-drop multiplexing with converged signal addition and removal.

As depicted, apparatus 200 includes one or more line input devices 180, a distributing device 110, a combining device 120, one or more line output devices 190, and a signal add-drop device 230. Apparatus 200 may accept a plurality of input signals from one or more line inputs 182, drop one or more of the accepted input signals, add one or more signals, and output a plurality of output signals at one or more line outputs 192. The one or more line input devices 180, distributing device 110, combining device 120 and one or more line output devices 190 of apparatus 200 may be identical to those of apparatus 100. Accordingly, in the interest of brevity, detailed description of the structure and operations of the one or more line input devices 180, distributing device 110, combining device 120 and one or more line output devices 190 of apparatus 200 will not be provided.

Signal add-drop device 230, coupled to distributing device 110 and to combining device 120, may accept one or more signal groups from distributing device 110 and may provide one or more signal groups to the combining device 120. Signal add-drop device 230 may include a plurality of third coupling elements 240a-m, a plurality of fourth coupling elements 250a-n, a band combiner 262, a band splitter 264, a set of one or more receivers 280a-p, and a set of one or more transmitters 290a-q.

Each of third coupling elements 240*a-m* may include a plurality of input ports to accept a respective plurality of the groups of signals provided by one or more of first coupling elements 112*a-k* of distributing device 110. Each of third coupling elements 240*a-m* may also include at least one output port to provide a group of signals. For example, third coupling element 240*a* may accept one or more distributed groups of signals 114 of the first wavelength band from first coupling element 112*a*, and may further accept one or more distributed groups of signals 142 of the first wavelength band from one or more other first coupling elements 112*b-k*. Moreover, third coupling element 240*a* may combine some number of accepted signals to provide one or more drop groups of signals 244 of the first wavelength band. Furthermore, third coupling element 240*b* may accept one or more distributed groups of signals 144 of the second wavelength band from one or more other first coupling elements 112*b-k*. Third coupling element 240*b* may combine some number of accepted signals to provide one or more drop groups of signals 266 of the second wavelength band.

Each of fourth coupling elements 250*a-n* may include at least one input port to accept at least one signal group. Each of fourth coupling elements 250*a-n* may also include a plurality of output ports to provide added signal groups to one or more of second coupling elements 122*a-l* of combining device 120. For example, fourth coupling element 250*a* may accept one or more added signal groups 254 of the first wavelength band. Fourth coupling element 250*a* may distribute at least some of the accepted signals into added signal groups, may provide at least one added signal group 124 of the first wavelength band to second coupling element 122*a*, and may also provide one or more added signal groups 152 of the first wavelength band to one or more other second coupling elements 122*b-l*. Furthermore, fourth coupling element 250*b* may accept one or more added signal groups 268 of the second wavelength band. Fourth coupling element 250*b* may distribute at least some of the accepted signals into added signal groups, and may provide one or more added signal groups 152 of the second wavelength band to one or more other second coupling elements 122*b-l*.

Band combiner 262 may accept and provide signal groups of two or more wavelength bands, including the first wavelength band and the second wavelength band. For example, band combiner 262 may be coupled to third coupling element 240*a* to accept a drop signal group 244 of the first wavelength band and may be coupled to one or more additional third coupling elements 240*b-m* to accept one or more drop signal groups 266 of one or more other wavelength bands, including the second wavelength band. The accepted drop signal groups may be combined into a single signal group, which may be provided to one or more receivers 280*a-p*.

Band splitter 264 may accept and provide signal groups of two or more wavelength bands, including the first wavelength band and the second wavelength band. For example, band splitter 264 may accept a signal group from one or more transmitters 290*a-q*. The accepted signals may be distributed into two or more add signal groups corresponding to different wavelength bands. Band splitter 264 may be coupled to fourth coupling element 250*a* to provide an added signal group 254 of the first wavelength band, and may be coupled to one or more additional fourth coupling elements 250*b-n* to provide one or more add signal groups 268 of one or more other wavelength bands, including the second wavelength band.

Each of a set of one or more receivers 280*a-p* may receive a respective signal provided in a drop signal group from band combiner 262. One or more of the plurality of receivers 280*a-p* may be capable of selectively receiving signals on a single wavelength or multiple wavelengths.

Optionally, signal add-drop device 230 may further include a splitter or demultiplexer coupled between band combiner 262 and the set of receivers 280*a-p*. In other words, each of the receivers 280*a-p* may be coupled indirectly to two or more of third coupling elements 240*a-m* via band combiner 262 and a splitter or demultiplexer. For example, as depicted in FIG. 2, splitter 272 may be coupled between the set of receivers 280*a-p* and band combiner 262.

Each of a set of one or more transmitters 290*a-q* may transmit a respective signal provided in an add signal group to band splitter 264. One or more of the plurality of transmitters 290*a-q* may be capable of selectively transmitting signals on a single wavelength or multiple wavelengths.

Optionally, signal add-drop device 230 may further include a combiner or multiplexer coupled between band splitter 264 and the set of transmitters 290*a-q*. In other words, each of the transmitters 290*a-q* may be coupled indirectly to two or more of fourth coupling elements 250*a-n* via band splitter 264 and a combiner or multiplexer. For example, as depicted in FIG. 2, combiner 274 may be coupled between the set of transmitters 290*a-q* and band splitter 264.

In some implementations there may be multiple band combiners 262, each coupled to respective sets of one or more receivers and each optionally including a respective optional splitter or demultiplexer coupled between the band combiner and set of receivers. In some implementations there may be multiple band splitters 264, each coupled to respective sets of one or more transmitters and each optionally including a respective optional combiner or multiplexer coupled between the band splitter and set of transmitters. For example, drop groups of signals 244 may be provided to one or more additional band combiners.

Figure 3:
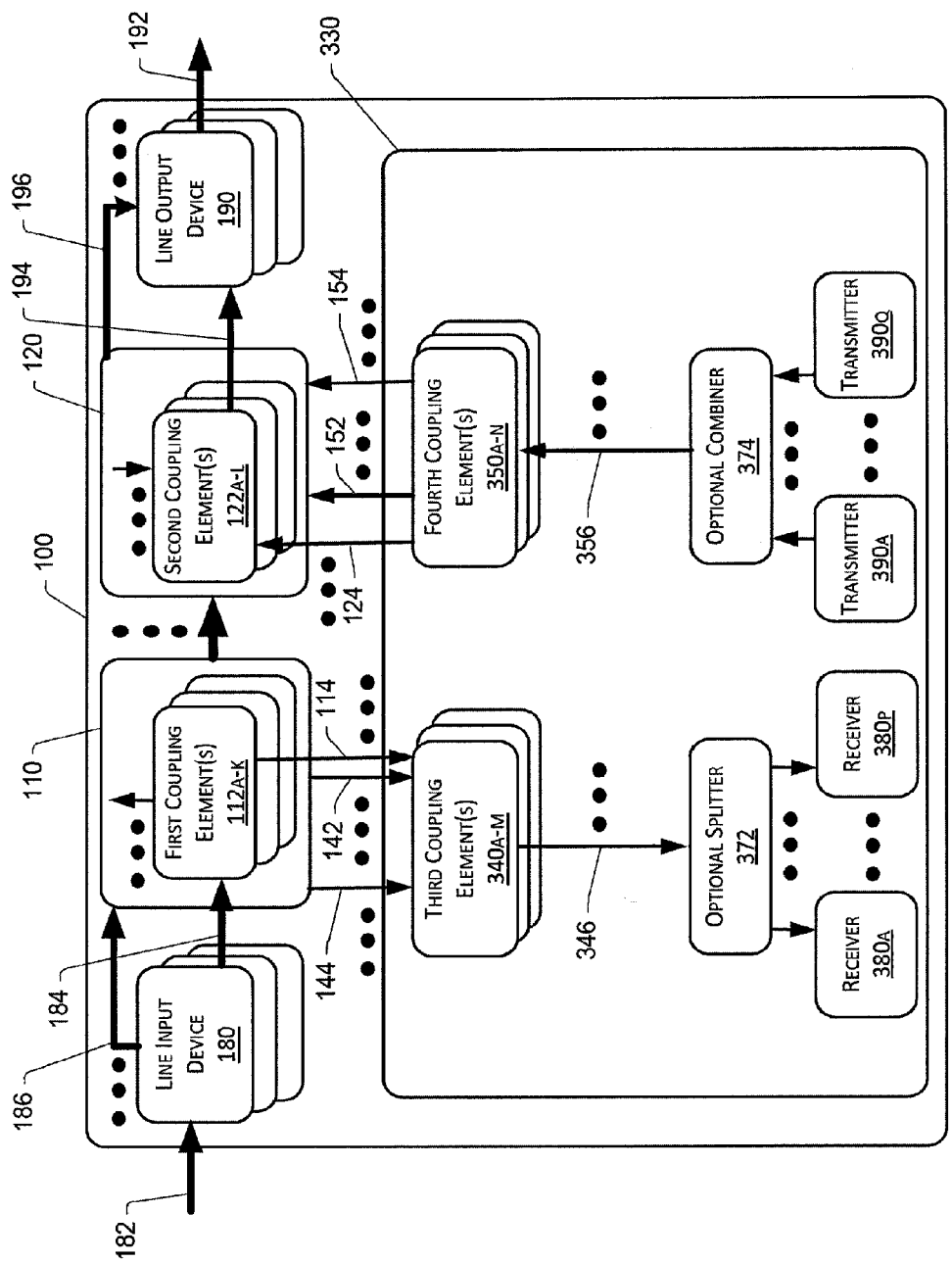
FIG. 3 shows another example apparatus for implementing at least one embodiment of multi-band reconfigurable optical add-drop multiplexing with converged signal addition and removal.

FIG. 3 shows an example apparatus 300 for implementing at least one embodiment of multi-band reconfigurable optical add-drop multiplexing with converged signal addition and removal.

As depicted, apparatus 300 includes one or more line input devices 180, a distributing device 110, a combining device 120, one or more line output devices 190, and a signal add-drop device 330. Apparatus 300 may accept a plurality of input signals from one or more line inputs 182, drop one or more of the accepted input signals, add one or more signals, and output a plurality of output signals at one or more line outputs 192. Line input device 180, distributing device 110, combining device 120 and line output device 190 of apparatus 300 may be identical to those of apparatus 100. Accordingly, in the interest of brevity, detailed description of the structure and operations of the one or more line input devices 180, distributing device 110, combining device 120 and one or more line output devices 190 of apparatus 300 will not be provided.

Signal add-drop device 330, coupled to distributing device 110 and to combining device 120, may accept one or more signal groups from distributing device 110 and may provide one or more signal groups to the combining device 120. Signal add-drop device 330 may include a plurality of third coupling elements 340*a-m*, a plurality of fourth coupling elements 350*a-n*, a set of one or more receivers 380*a-p*, and a set of one or more transmitters 390*a-q*.

Each of third coupling elements 340*a-m* may include a plurality of input ports to accept a respective plurality of the groups of signals provided by one or more of first coupling elements 112*a-k* of distributing device 110. Each of third coupling elements 340*a-m* may also include at least one output port to provide a group of signals. For example, third coupling element 340a may accept one or more distributed groups of signals 114 of the first wavelength band from first coupling element 112a, may accept one or more distributed groups of signals 142 of the first wavelength band from one or more other first coupling elements 112b-k, and may accept one or more distributed groups of signals 144 of one or more other wavelength bands, including the second wavelength band, from one or more other first coupling elements 112b-k. Moreover, third coupling element 340a may combine some number of accepted signals to provide one or more drop groups of signals 346.

Each of fourth coupling elements 350a-n may include at least one input port to accept at least one signal group. Each of fourth coupling elements 350a-n may also include a plurality of output ports to provide added signal groups to one or more of second coupling elements 122a-l of combining device 120. For example, fourth coupling element 350a may accept one or more added signal groups 356 of one or more wavelength bands. Fourth coupling element 350a may distribute at least some of the accepted signals into added signal groups, may provide one or more added signal groups 124 of the first wavelength band to second coupling element 122a, may provide one or more added signal groups 152 of the first wavelength band to one or more other second coupling elements 122b-l, and may provide one or more added signal groups 154 of one or more other wavelength bands, including the second wavelength band, to one or more other second coupling elements 122b-l.

Each of a set of one or more receivers 380a-p may receive a respective signal provided in a drop signal group from one of the third coupling elements 340a-m. One or more of the plurality of receivers 380a-p may be capable of selectively receiving signals on a single wavelength or multiple wavelengths.

Optionally, signal add-drop device 330 may further include a splitter or demultiplexer coupled between third coupling elements 340a-m and the set of receivers 380a-p. In other words, each of the receivers 380a-p may be coupled indirectly to a third coupling element 340a-m via a splitter or demultiplexer. For example, as depicted in FIG. 3, splitter 372 may be coupled between the set of receivers 380a-p and third coupling element 340a.

Each of a set of one or more transmitters 390a-q may transmit a respective signal provided in an add signal group to one of the fourth coupling elements 350a-n. One or more of the plurality of transmitters 390a-q may be capable of selectively transmitting signals on a single wavelength or multiple wavelengths.

Optionally, signal add-drop device 330 may further include a combiner or multiplexer coupled between fourth coupling elements 350a-n and the set of transmitters 390a-q. In other words, each of the transmitters 390a-q may be coupled indirectly to a fourth coupling element 350a-n via a combiner or multiplexer. For example, as depicted in FIG. 3, combiner 374 may be coupled between the set of transmitters 390a-q and fourth coupling element 350a.

In some implementations there may be multiple sets of one or more receivers each optionally including a respective optional splitter or demultiplexer coupled between a third coupling element and respective set of receivers. In some implementations there may be multiple sets of one or more transmitters each optionally including a respective optional combiner or multiplexer coupled between a fourth coupling element and respective set of transmitters.

Figure 4:
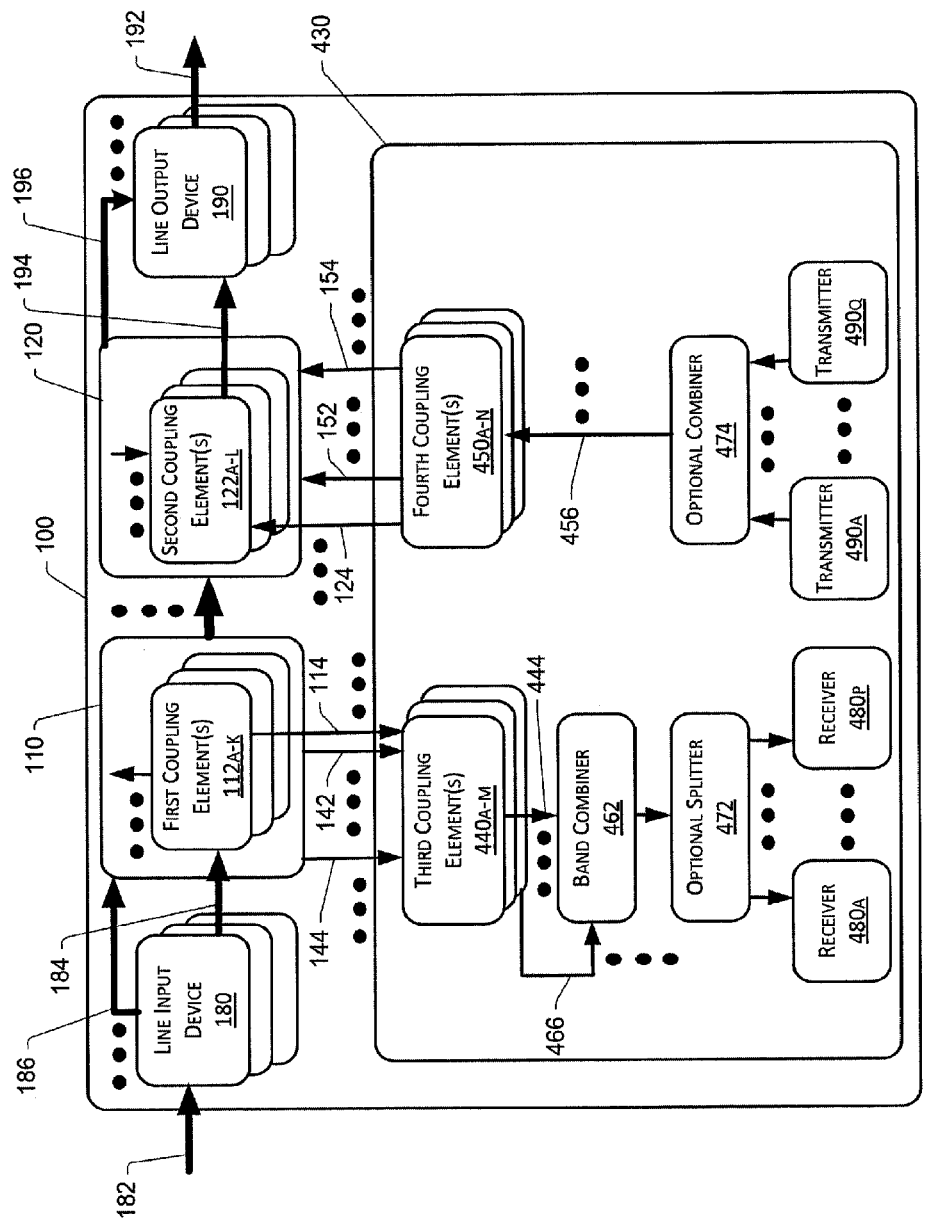
FIG. 4 shows yet another example apparatus for implementing at least one embodiment of multi-band reconfigurable optical add-drop multiplexing with converged signal addition and removal.

FIG. 4 shows an example apparatus 400 for implementing at least one embodiment of multi-band reconfigurable optical add-drop multiplexing with converged signal addition and removal.

As depicted, apparatus 400 includes one or more line input devices 180, a distributing device 110, a combining device 120, one or more line output devices 190, and a signal add-drop device 430. Apparatus 400 may accept a plurality of input signals from one or more line inputs 182, drop one or more of the accepted input signals, add one or more signals, and output a plurality of output signals at one or more line outputs 192. Line input device 180, distributing device 110, combining device 120 and line output device 190 of apparatus 400 may be identical to those of apparatus 100. Accordingly, in the interest of brevity, detailed description of the structure and operations of the one or more line input devices 180, distributing device 110, combining device 120 and one or more line output devices 190 of apparatus 400 will not be provided.

Signal add-drop device 430, coupled to distributing device 110 and to combining device 120, may accept one or more signal groups from distributing device 110 and may provide one or more signal groups to the combining device 120. Signal add-drop device 430 may include a plurality of third coupling elements 440a-m, a plurality of fourth coupling elements 450a-n, a band combiner 462, a set of one or more receivers 480a-p, and a set of one or more transmitters 490a-q.

Each of third coupling elements 440a-m may include a plurality of input ports to accept a respective plurality of the groups of signals provided by one or more of first coupling elements 112a-k of distributing device 110. Each of third coupling elements 440a-m may also include at least one output port to provide a group of signals. For example, third coupling element 440a may accept one or more distributed groups of signals 114 of the first wavelength band from first coupling element 112a, and may further accept one or more distributed groups of signals 142 of the first wavelength band from one or more other first coupling elements 112b-k. Moreover, third coupling element 440a may combine some number of accepted signals to provide one or more drop groups of signals 444 of the first wavelength band. Furthermore, third coupling element 440b may accept one or more distributed groups of signals 144 of the second wavelength band from one or more other first coupling elements 112b-k. Third coupling element 440b may combine some number of accepted signals to provide one or more drop groups of signals 466 of the second wavelength band.

Each of fourth coupling elements 450a-n may include at least one input port to accept at least one signal group. Each of fourth coupling elements 450a-n may also include a plurality of output ports to provide added signal groups to one or more of second coupling elements 122a-l of combining device 120. For example, fourth coupling element 450a may accept one or more added signal groups 456 of one or more wavelength bands. Fourth coupling element 450a may distribute at least some of the accepted signals into added signal groups, may provide one or more added signal groups 124 of the first wavelength band to second coupling element 122a, may provide one or more added signal groups 152 of the first wavelength band to one or more other second coupling elements 122b-l, and may provide one or more added signal groups 154 of one or more other wavelength bands, including the second wavelength band, to one or more other second coupling elements 122b-l.

Band combiner 462 may accept and provide signal groups of two or more wavelength bands, including the first wavelength band and the second wavelength band. For example, band combiner 462 may be coupled to third coupling element 440a to accept a drop signal group 444 of the first wavelength band and may be coupled to one or more additional third coupling elements 440b-m to accept one or more drop signal groups 466 of one or more other wavelength bands, including the second wavelength band. The accepted drop signal groups may be combined into a single signal group, which may be provided to one or more receivers 480a-p.

Each of a set of one or more receivers 480a-p may receive a respective signal provided in a drop signal group from band combiner 462. One or more of the plurality of receivers 480a-p may be capable of selectively receiving signals on a single wavelength or multiple wavelengths.

Optionally, signal add-drop device 430 may further include a splitter or demultiplexer coupled between band combiner 462 and the set of receivers 480a-p. In other words, each of the receivers 480a-p may be coupled indirectly to two or more of third coupling elements 440a-m via band combiner 462 and a splitter or demultiplexer. For example, as depicted in FIG. 4, splitter 472 may be coupled between the set of receivers 480a-p and band combiner 462.

Each of a set of one or more transmitters 490a-q may transmit a respective signal provided in an add signal group to one of the fourth coupling elements 450a-n. One or more of the plurality of transmitters 490a-q may be capable of selectively transmitting signals on a single wavelength or multiple wavelengths.

Optionally, signal add-drop device 430 may further include a combiner or multiplexer coupled between fourth coupling elements 450a-n and the set of transmitters 490a-q. In other words, each of the transmitters 490a-q may be coupled indirectly to a fourth coupling element 450a-n via a combiner or multiplexer. For example, as depicted in FIG. 4, combiner 474 may be coupled between the set of transmitters 490a-q and fourth coupling element 450a.

In some implementations there may be multiple band combiners 462, each coupled to respective sets of one or more receivers and each optionally including a respective optional splitter or demultiplexer coupled between the band combiner and set of receivers. In some implementations there may be multiple sets of one or more transmitters each optionally including a respective optional combiner or multiplexer coupled between a fourth coupling element and respective set of transmitters.

Figure 5:
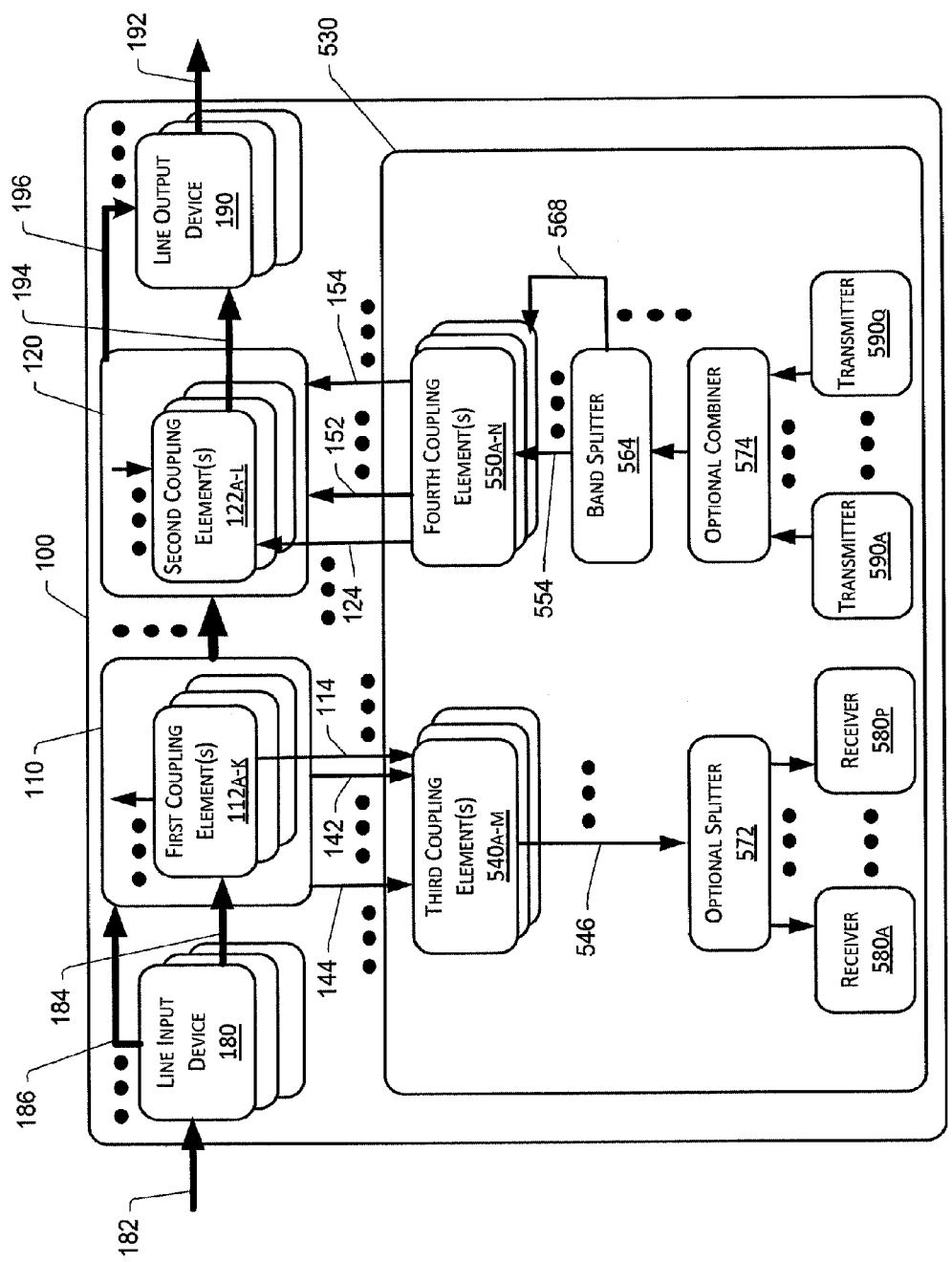
FIG. 5 shows still another example apparatus for implementing at least one embodiment of multi-band reconfigurable optical add-drop multiplexing with converged signal addition and removal.

FIG. 5 shows an example apparatus 500 for implementing at least one embodiment of multi-band reconfigurable optical add-drop multiplexing with converged signal addition and removal.

As depicted, apparatus 500 includes one or more line input devices 180, a distributing device 110, a combining device 120, one or more line output devices 190, and a signal add-drop device 530. Apparatus 500 may accept a plurality of input signals from one or more line inputs 182, drop one or more of the accepted input signals, add one or more signals, and output a plurality of output signals at one or more line outputs 192. Line input device 180, distributing device 110, combining device 120 and line output device 190 of apparatus 500 may be identical to those of apparatus 100. Accordingly, in the interest of brevity, detailed description of the structure and operations of the one or line input devices 180, distributing device 110, combining device 120 and one or more line output devices 190 of apparatus 500 will not be provided.

Signal add-drop device 530, coupled to distributing device 110 and to combining device 120, may accept one or more signal groups from distributing device 110 and may provide one or more signal groups to the combining device 120. Signal add-drop device 530 may include a plurality of third coupling elements 540a-m, a plurality of fourth coupling elements 550a-n, a band splitter 564, a set of one or more receivers 580a-p, and a set of one or more transmitters 590a-q.

Each of third coupling elements 540a-m may include a plurality of input ports to accept a respective plurality of the groups of signals provided by one or more of first coupling elements 112a-k of distributing device 110. Each of third coupling elements 540a-m may also include at least one output port to provide a group of signals. For example, third coupling element 540a may accept one or more distributed groups of signals 114 of the first wavelength band from first coupling element 112a, may accept one or more distributed groups of signals 142 of the first wavelength band from one or more other first coupling elements 112b-k, and may accept one or more distributed groups of signals 144 of one or more other wavelength bands, including the second wavelength band, from one or more other first coupling elements 112b-k. Moreover, third coupling element 540a may combine some number of accepted signals to provide one or more drop groups of signals 546.

Each of fourth coupling elements 550a-n may include at least one input port to accept at least one signal group. Each of fourth coupling elements 550a-n may also include a plurality of output ports to provide added signal groups to one or more of second coupling elements 122a-l of combining device 120. For example, fourth coupling element 550a may accept one or more added signal groups 554 of the first wavelength band. Fourth coupling element 550a may distribute at least some of the accepted signals into added signal groups, may provide at least one added signal group 124 of the first wavelength band to second coupling element 122a, and may also provide one or more added signal groups 152 of the first wavelength band to one or more other second coupling elements 122b-l. Furthermore, fourth coupling element 550b may accept one or more added signal groups 568 of the second wavelength band. Fourth coupling element 550b may distribute at least some of the accepted signals into added signal groups, and may provide one or more added signal groups 152 of the second wavelength band to one or more other second coupling elements 122b-l.

Band splitter 564 may accept and provide signal groups of two or more wavelength bands, including the first wavelength band and the second wavelength band. For example, band splitter 564 may accept a signal group from one or more transmitters 590a-q. The accepted signals may be distributed into two or more add signal groups corresponding to different wavelength bands. Band splitter 564 may be coupled to fourth coupling element 550a to provide an added signal group 554 of the first wavelength band, and may be coupled to one or more additional fourth coupling elements 550b-n to provide one or more add signal groups 568 of one or more other wavelength bands, including the second wavelength band.

Each of a set of one or more receivers 580a-p may receive a respective signal provided in a drop signal group from one of the third coupling elements 540a-m. One or more of the plurality of receivers 580a-p may be capable of selectively receiving signals on a single wavelength or multiple wavelengths.

Optionally, signal add-drop device 530 may further include a splitter or demultiplexer coupled between third coupling elements 540a-m and the set of receivers 580a-p. In other words, each of the receivers 580a-p may be coupled indirectly to a third coupling element 540a-m via a splitter or demultiplexer. For example, as depicted in FIG. 5, splitter 572 may be coupled between the set of receivers 580a-p and third coupling element 540a.

Each of a set of one or more transmitters 590a-q may transmit a respective signal provided in an add signal group to band splitter 564. One or more of the plurality of transmitters 590a-q may be capable of selectively transmitting signals on a single wavelength or multiple wavelengths.

Optionally, signal add-drop device 530 may further include a combiner or multiplexer coupled between band splitter 564 and the set of transmitters 590a-q. In other words, each of the transmitters 590a-q may be coupled indirectly to two or more of fourth coupling elements 550a-n via band splitter 564 and a combiner or multiplexer. For example, as depicted in FIG. 5, combiner 574 may be coupled between the set of transmitters 590a-q and band splitter 564.

In some implementations there may be multiple sets of one or more receivers each optionally including a respective optional splitter or demultiplexer coupled between a third coupling element and respective set of receivers. In some implementations there may be multiple band splitters 564, each coupled to respective sets of one or more transmitters and each optionally including a respective optional combiner or multiplexer coupled between the band splitter and set of transmitters.

Figure 6:
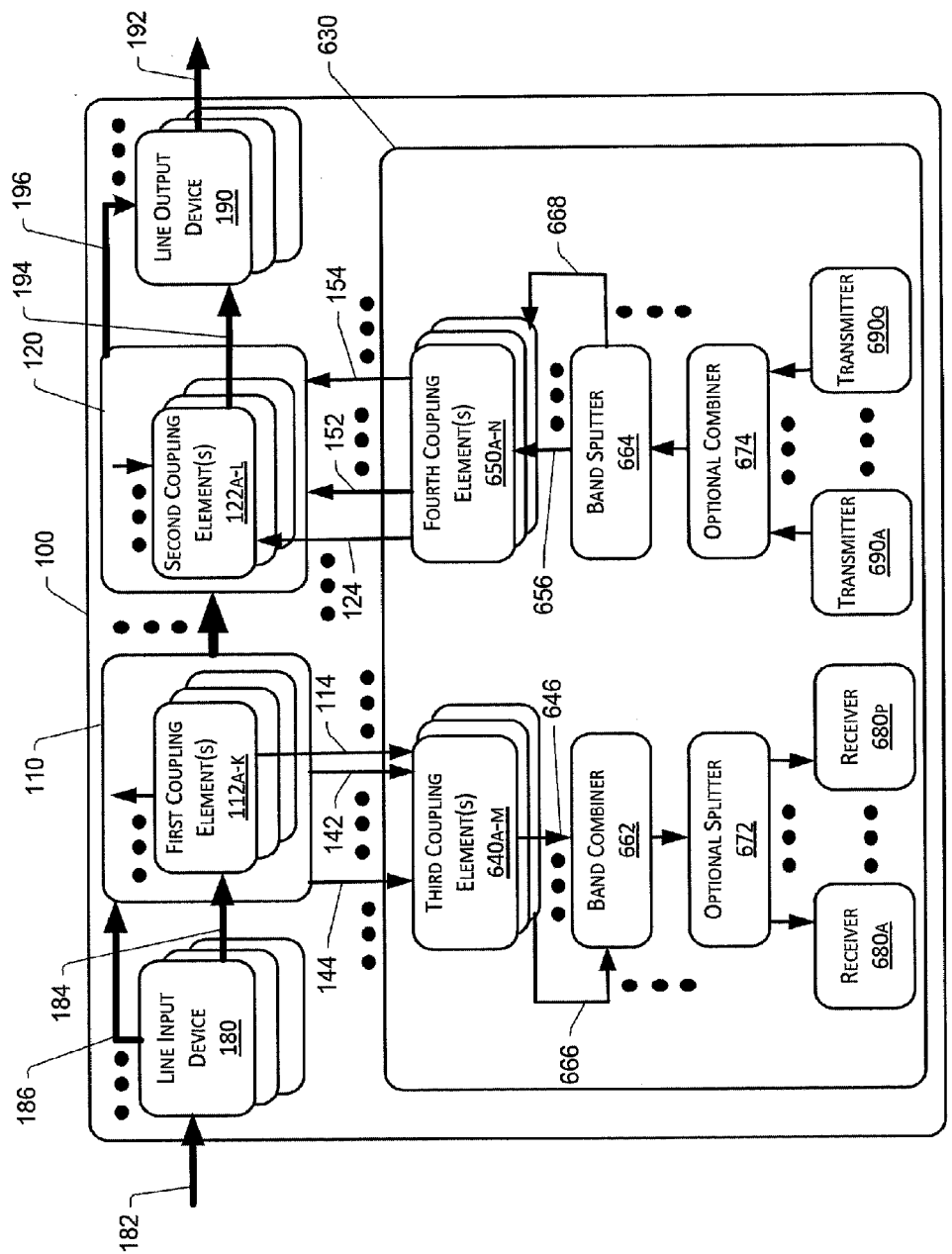
FIG. 6 shows a further example apparatus for implementing at least one embodiment of multi-band reconfigurable optical add-drop multiplexing with converged signal addition and removal.

FIG. 6 shows an example apparatus 600 for implementing at least one embodiment of multi-band reconfigurable optical add-drop multiplexing with converged signal addition and removal.

As depicted, apparatus 600 includes one or more line input devices 180, a distributing device 110, a combining device 120, one or more line output devices 190, and a signal add-drop device 630. Apparatus 600 may accept a plurality of input signals from one or more line inputs 182, drop one or more of the accepted input signals, add one or more signals, and output a plurality of output signals at one or more line outputs 192. Line input device 180, distributing device 110, combining device 120 and line output device 190 of apparatus 600 may be identical to those of apparatus 100. Accordingly, in the interest of brevity, detailed description of the structure and operations of the one or more line input devices 180, distributing device 110, combining device 120 and one or more line output devices 190 of apparatus 600 will not be provided.

Signal add-drop device 630, coupled to distributing device 110 and to combining device 120, may accept one or more signal groups from distributing device 110 and may provide one or more signal groups to the combining device 120. Signal add-drop device 630 may include a plurality of third coupling elements 640a-m, a plurality of fourth coupling elements 650a-n, a band combiner 662, a band splitter 664, a set of one or more receivers 680a-p, and a set of one or more transmitters 690a-q.

Each of third coupling elements 640a-m may include a plurality of input ports to accept a respective plurality of the groups of signals provided by one or more of first coupling elements 112a-k of distributing device 110. Each of third coupling elements 640a-m may also include at least one output port to provide a group of signals. For example, third coupling element 640a may accept one or more distributed groups of signals 114 of the first wavelength band from first coupling element 112a, may accept one or more distributed groups of signals 142 of the first wavelength band from one or more other first coupling elements 112b-k, and may accept one or more distributed groups of signals 144 of one or more other wavelength bands, including the second wavelength band, from one or more other first coupling elements 112b-k.

Moreover, third coupling element 640a may combine some number of accepted signals to provide one or more drop groups of signals 646. Furthermore, third coupling element 640b may accept one or more distributed groups of signals 114 of the first wavelength band from first coupling element 112a, may accept one or more distributed groups of signals 142 of the first wavelength band from one or more other first coupling elements 112b-k, and may accept one or more distributed groups of signals 144 of one or more other wavelength bands, including the second wavelength band, from one or more other first coupling elements 112b-k. Third coupling element 240b may combine some number of accepted signals to provide one or more drop groups of signals 666.

Each of fourth coupling elements 650a-n may include at least one input port to accept at least one signal group. Each of fourth coupling elements 650a-n may also include a plurality of output ports to provide added signal groups to one or more of second coupling elements 122a-l of combining device 120. For example, fourth coupling element 650a may accept one or more added signal groups 656 of one or more wavelength bands. Fourth coupling element 650a may distribute at least some of the accepted signals into added signal groups, may provide one or more added signal groups 124 of the first wavelength band to second coupling element 122a, may provide one or more added signal groups 152 of the first wavelength band to one or more other second coupling elements 122b-l, and may provide one or more added signal groups 154 of one or more other wavelength bands, including the second wavelength band, to one or more other second coupling elements 122b-l. Furthermore, fourth coupling element 650b may accept one or more added signal groups 668 of the second wavelength band. Fourth coupling element 250b may distribute at least some of the accepted signals into added signal groups, may provide one or more added signal groups 124 of the first wavelength band to second coupling element 122a, may provide one or more added signal groups 152 of the first wavelength band to one or more other second coupling elements 122b-l, and may provide one or more added signal groups 154 of one or more other wavelength bands, including the second wavelength band, to one or more other second coupling elements 122b-l.

Band combiner 662 may accept and provide signal groups of two or more wavelength bands, which may include the first wavelength band and the second wavelength band. For example, band combiner 662 may be coupled to third coupling element 240a to accept a drop signal group 646 and may be coupled to one or more additional third coupling elements 240b-m to accept one or more drop signal groups 666 of one or more wavelength bands different than the wavelength band or bands of respective signal group 646. The accepted drop signal groups may be combined into a single signal group, which may be provided to one or more receivers 680a-p.

Band splitter 664 may accept and provide signal groups of two or more wavelength bands, which may include the first wavelength band and the second wavelength band. For example, band splitter 664 may accept a signal group from one or more transmitters 690a-q. The accepted signals may be distributed into two or more add signal groups. Band splitter 664 may be coupled to fourth coupling element 650a to provide an added signal group 656, and may be coupled to one or more additional fourth coupling elements 250b-n to provide one or more add signal groups 668 of one or more other wavelength bands different than the wavelength band or bands of respective signal group 656.

Each of a set of one or more receivers 680a-p may receive a respective signal provided in a drop signal group from band combiner 662. One or more of the plurality of receivers 680*a-p* may be capable of selectively receiving signals on a single wavelength or multiple wavelengths.

Optionally, signal add-drop device 630 may further include a splitter or demultiplexer coupled between band combiner 662 and the set of receivers 680*a-p*. In other words, each of the receivers 680*a-p* may be coupled indirectly to two or more of third coupling elements 640*a-m* via band combiner 662 and a splitter or demultiplexer. For example, as depicted in FIG. 6, splitter 672 may be coupled between the set of receivers 680*a-p* and band combiner 662.

Each of a set of one or more transmitters 690*a-q* may transmit a respective signal provided in an add signal group to band splitter 664. One or more of the plurality of transmitters 690*a-q* may be capable of selectively transmitting signals on a single wavelength or multiple wavelengths.

Optionally, signal add-drop device 630 may further include a combiner or multiplexer coupled between band splitter 664 and the set of transmitters 690*a-q*. In other words, each of the transmitters 690*a-q* may be coupled indirectly to two or more of fourth coupling elements 650*a-n* via band splitter 664 and a combiner or multiplexer. For example, as depicted in FIG. 6, combiner 674 may be coupled between the set of transmitters 690*a-q* and band splitter 664.

In some implementations there may be multiple band combiners 662, each coupled to respective sets of one or more receivers and each optionally including a respective optional splitter or demultiplexer coupled between the band combiner and set of receivers. In some implementations there may be multiple band splitters 664, each coupled to respective sets of one or more transmitters and each optionally including a respective optional combiner or multiplexer coupled between the band splitter and set of transmitters.

Figure 7:
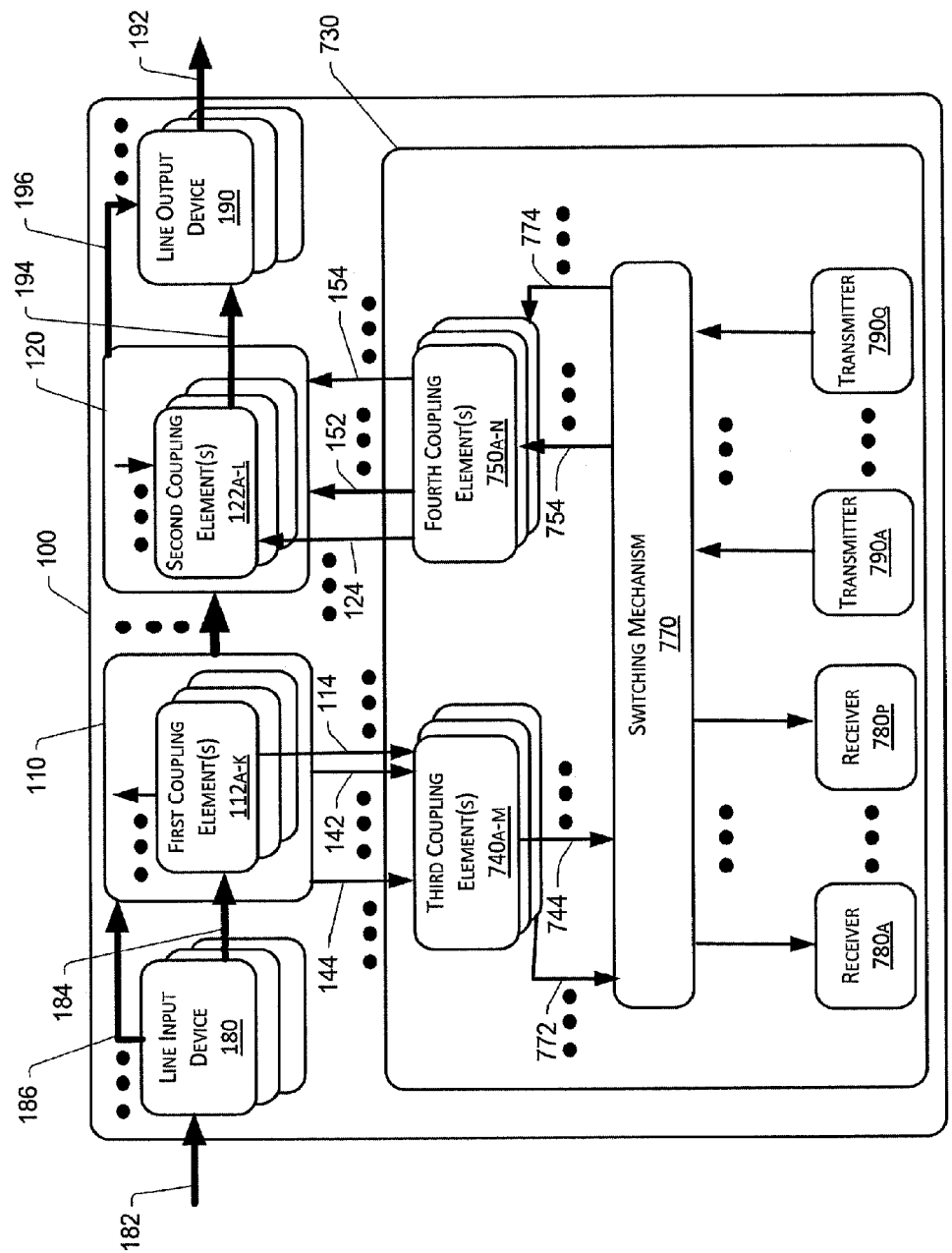
FIG. 7 shows still a further example apparatus for implementing at least one embodiment of multi-band reconfigurable optical add-drop multiplexing with converged signal addition and removal.

FIG. 7 shows an example apparatus 700 for implementing at least one embodiment of multi-band reconfigurable optical add-drop multiplexing with converged signal addition and removal.

As depicted, apparatus 700 includes one or more line input devices 180, a distributing device 110, a combining device 120, one or more line output devices 190, and a signal add-drop device 730. Apparatus 700 may accept a plurality of input signals from one or more line inputs 182, drop one or more of the accepted input signals, add one or more signals, and output a plurality of output signals at one or more line outputs 192. Line input device 180, distributing device 110, combining device 120 and line output device 190 of apparatus 700 may be identical to those of apparatus 100. Accordingly, in the interest of brevity, detailed description of the structure and operations of the one or more line input devices 180, distributing device 110, combining device 120 and one or more line output devices 190 of apparatus 700 will not be provided.

Signal add-drop device 730, coupled to distributing device 110 and to combining device 120, may accept one or more signal groups from distributing device 110 and may provide one or more signal groups to the combining device 120. Signal add-drop device 730 may include a plurality of third coupling elements 740*a-m*, a plurality of fourth coupling elements 750*a-n*, a switching mechanism 770, a set of one or more receivers 780*a-p*, and a set of one or more transmitters 790*a-q*.

Each of third coupling elements 740*a-m* may include a plurality of input ports to accept a respective plurality of the groups of signals provided by one or more of first coupling elements 112*a-k* of distributing device 110. Each of third coupling elements 740*a-m* may also include at least one output port to provide a group of signals. For example, third coupling element 740*a* may accept one or more distributed groups of signals 114 of the first wavelength band from first coupling element 112*a*, and may further accept one or more distributed groups of signals 142 of the first wavelength band from one or more other first coupling elements 112*b-k*. Moreover, third coupling element 740*a* may combine some number of accepted signals to provide one or more drop groups of signals 744 of the first wavelength band. Furthermore, third coupling element 740*b* may accept one or more distributed groups of signals 144 of the second wavelength band from one or more other first coupling elements 112*b-k*. Third coupling element 740*b* may combine some number of accepted signals to provide one or more drop groups of signals 772 of the second wavelength band.

Each of fourth coupling elements 750*a-n* may include at least one input port to accept at least one signal group. Each of fourth coupling elements 750*a-n* may also include a plurality of output ports to provide added signal groups to one or more of second coupling elements 122*a-l* of combining device 120. For example, fourth coupling element 750*a* may accept one or more added signal groups 754 of the first wavelength band. Fourth coupling element 750*a* may distribute at least some of the accepted signals into added signal groups, may provide at least one added signal group 124 of the first wavelength band to second coupling element 122*a*, and may also provide one or more added signal groups 152 of the first wavelength band to one or more other second coupling elements 122*b-l*. Furthermore, fourth coupling element 750*b* may accept one or more added signal groups 774 of the second wavelength band. Fourth coupling element 750*b* may distribute at least some of the accepted signals into added signal groups, and may provide one or more added signal groups 152 of the second wavelength band to one or more other second coupling elements 122*b-l*.

Switching mechanism 770 may accept and provide signal groups of two or more wavelength bands, including the first wavelength band and the second wavelength band. For example, switching mechanism 770 may be coupled to one or more third coupling elements 740*a-m* to accept one or more drop signal groups 744 of the first wavelength band and one or more drop signal groups 772 of one or more other wavelength bands, including the second wavelength band. Some number of accepted drop signal groups may be provided by switching mechanism 770 to one or more receivers 780*a-p*. Moreover, switching mechanism 770 accept some number of added signal groups from one or more transmitters 790*a-q*. Switching mechanism 770 may be coupled to one or more fourth coupling elements 750*a-n* to provide one or more accepted added signal groups 754 of the first wavelength band and one or more added signal groups 774 of one or more other wavelength bands, including the second wavelength band. Switching mechanism 770 may include an optical cross-connect.

Each of a set of one or more receivers 790*a-q* may receive a respective signal provided in a drop signal group from switching mechanism 770. One or more of the plurality of receivers 780*a-p* may be capable of selectively receiving signals on a single wavelength or multiple wavelengths.

Each of a set of one or more transmitters 780*a-q* may transmit a respective signal provided in an add signal group to switching mechanism 770. One or more of the plurality of transmitters 790*a-q* may be capable of selectively transmitting signals on a single wavelength or multiple wavelengths.

In some implementations switching mechanism 770 may include separate switching for add groups and separate switching for drop groups. In some implementations there may be multiple switching mechanisms 770, each of which may be coupled to respective sets of one or more receivers and may be coupled to respective sets of one or more transmitters.

In some implementations an optional splitter or demultiplexer may be coupled between a switching mechanism 770 and a set of one or more receivers. In some implementations an optional combiner or multiplexer may be coupled between a switching mechanism 770 and a set of one or more transmitters.

Each of first coupling elements 112a-k, as well as each of fourth coupling elements 250a-n, 350a-n, 450a-n, 550a-n, 650a-n and 750a-n, has at least one input port and a plurality of output ports. Each of second coupling elements 122a-l, as well as each of third coupling elements 240a-m, 340a-m, 440a-m, 540a-m, 640a-m and 740a-m, has a plurality of input ports and at least one output port.

One or more first coupling elements 112a-k or one or more fourth coupling elements 250a-n, 350a-n, 450a-n, 550a-n, 650a-n and 750a-n may be passive, e.g., a splitter, when there is only a single input port. Alternatively, one or more first coupling elements 112a-k or one or more fourth coupling elements 250a-n, 350a-n, 450a-n, 550a-n, 650a-n and 750a-n may be switchable, e.g., a wavelength selective switch. Likewise, one or more second coupling elements 122a-l or one or more third coupling elements 240a-m, 340a-m, 440a-m, 540a-m, 640a-m and 740a-m may be passive, e.g., a splitter, when there is only a single output port. Alternatively, one or more second coupling elements 122a-l or one or more third coupling elements 240a-m, 340a-m, 440a-m, 540a-m, 640a-m and 740a-m may be switchable, e.g., a wavelength selective switch. Various ones of first coupling elements 112a-k, second coupling elements 122a-l, third coupling elements 240a-m, 340a-m, 440a-m, 540a-m, 640a-m and 740a-m, and fourth coupling elements 250a-n, 350a-n, 450a-n, 550a-n, 650a-n and 750a-n that are of the same type need not be identical, e.g., in terms of port or switching characteristics.

In various embodiments, passive and switchable elements may be mixed within the same type of coupling elements. However, the following requirements must be met: (1) either all first coupling elements 112a-k are switchable or all second coupling elements 122a-l are switchable; (2) if all first coupling elements 112a-k are switchable, then third coupling elements 240a-m, 340a-m, 440a-m, 540a-m, 640a-m and 740a-m may be passive or switchable; otherwise third coupling elements 240a-m, 340a-m, 440a-m, 540a-m, 640a-m and 740a-m are switchable; and (3) if all second coupling elements 122a-l are switchable, then fourth coupling elements 250a-n, 350a-n, 450a-n, 550a-n, 650a-n and 750a-n may be passive or switchable; otherwise fourth coupling elements 250a-n, 350a-n, 450a-n, 550a-n, 650a-n and 750a-n are switchable.

The use of multiple bands provides a number of advantages over a same size ROADM node in a signal band. Under the described architectures, channel isolation is improved, performance requirements for switching elements are lower, and it may be possible to reduce the number of line side switching elements by a factor of two. These factors are expected to translate into significant improvements in cost, size and performance.

Additional benefits are expected as a result of signals passing through half of the number of switching elements when routed through a ROADM node where architecture of the present disclosure is implemented. This reduces signal degradation due to effects such as channel narrowing, thus improving optical signal reach and reducing system cost since less regeneration is required. The described architectures also allow a larger number of ROADM nodes to be supported in the system for a given optical path.

The use of additional spectrum per fiber with the described architectures also reduces the degree of contention at signal addition and removal. This provides operational advantage and potentially reduces switching/routing complexity and cost even further. For example, the complexity of switches and/or number of switches required for a contentionless ROADM is greatly reduced.

The proposed ROADM architectures support optical networks with higher capacities per fiber and therefore conserve fiber assets. The architectures are modular in nature, allowing a network to be deployed in a single-band setting to begin with, and to be upgraded to support multiple bands later. For example, existing C-band ROADM networks may be upgraded to support additional spectrum bands.

Exemplary Process

Figure 8:
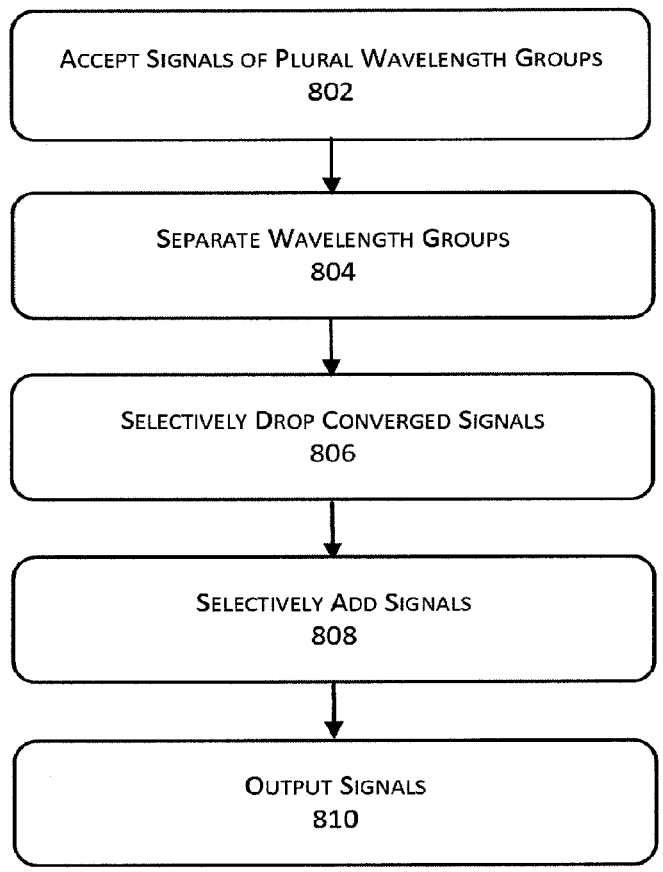
FIG. 8 shows a processing flow for at least an example apparatus in accordance with one or more embodiments of multi-band reconfigurable optical add-drop multiplexing with converged signal addition and removal.

FIG. 8 shows a processing flow 800 for at least an example apparatus implementing multi-band reconfigurable optical add-drop multiplexing with converged signal addition and removal.

Example processing flow 800 may include one or more operations, actions, or functions as illustrated by one or more of blocks 802, 804, 806 and 808. Although illustrated as discrete blocks, various blocks may be divided into additional blocks, combined into fewer blocks, or eliminated, depending on the desired implementation. Further, in accordance with a first example embodiment, processing flow 800 is described in the context of apparatus 100, apparatus 200, apparatus 300, apparatus 400, apparatus 500, apparatus 600 and apparatus 700 on which multi-band reconfigurable optical add-drop multiplexing with converged signal addition and removal is achieved. Processing flow 800 may begin at block 802.

Block 802 (Accept Signals of Plural Wavelength Groups) may include accepting a plurality of input signals of a plurality of wavelengths belonging to a plurality of wavelength groups. A wavelength group may consist of contiguous wavelengths, or blocks of wavelength spectrum, for example a wavelength band. Alternatively, a wavelength group may consist of non-contiguous wavelengths, or blocks of wavelength spectrum, for example a set of odd or even interleaved wavelength channels. Moreover, a wavelength group may consist of wavelengths, or blocks of wavelength spectrum, which include a combination of contiguous and non-contiguous blocks of wavelength spectrum. For example, as described above, one or more line input devices 180 may accept a plurality of input signals from one or more line inputs 182, the input signals belonging to a plurality of wavelength bands including the first wavelength band and the second wavelength band. The plurality of wavelength bands may include a plurality of wavelengths in C band and a plurality of wavelengths in L band.

Block 804 (Separate Wavelength Groups) may include separating a plurality of accepted input signals into sets of signals belonging to different wavelength groups. For example, as described above, each line input device 180 may output a plurality of the input signals as a plurality of bundles of input signals, including a bundle of first input signals 184 of a first wavelength band and a bundle of second input signals 186 of the second wavelength band. The separating may be executed by, for example, one or more interleaver filters.

Block 806 (Selectively Drop Converged Signals) may include selectively dropping one or more input signals of one or more of the plurality of wavelength groups among the accepted plurality of input signals. Signal drop is configurable such that a drop group of signals may include signals from any of the plurality of wavelength groups. In at least some implementations a drop group of signals may include signals from multiple wavelength groups. For example, as described above, signal add-drop device 130, 230, 330, 430, 530, 630 or 730 may drop one or more signals of one or more wavelength bands including the first wavelength band and the second wavelength band. In one embodiment, the accepting, the separating, and the selectively dropping are executed by a ROADM, and the separating is executed by an integrated array of two or more interleaver filters.

Block 808 (Selectively Add Signals) may include selectively adding one or more added signals of one or more of the plurality of wavelength groups. For example, as described above, signal add-drop device 130, 230, 330, 430, 530, 630 or 730 may provide one or more added signals of one or more wavelength bands including the first wavelength band and the second wavelength band.

Block 810 (Output Signals) may include outputting signals which may include some or all of the input signals or one or more added signals, or both some or all of the input signals and the one or more added signals. For example, as described above, one or more line output devices 190 may accept one or more bundles of first output signals 194 of the first wavelength band, and may further accept one or more bundles of second output signals 196 of the second wavelength band. The one or more line output devices 190 may provide a plurality of output signals to one or more line outputs 192.

Figure 9:
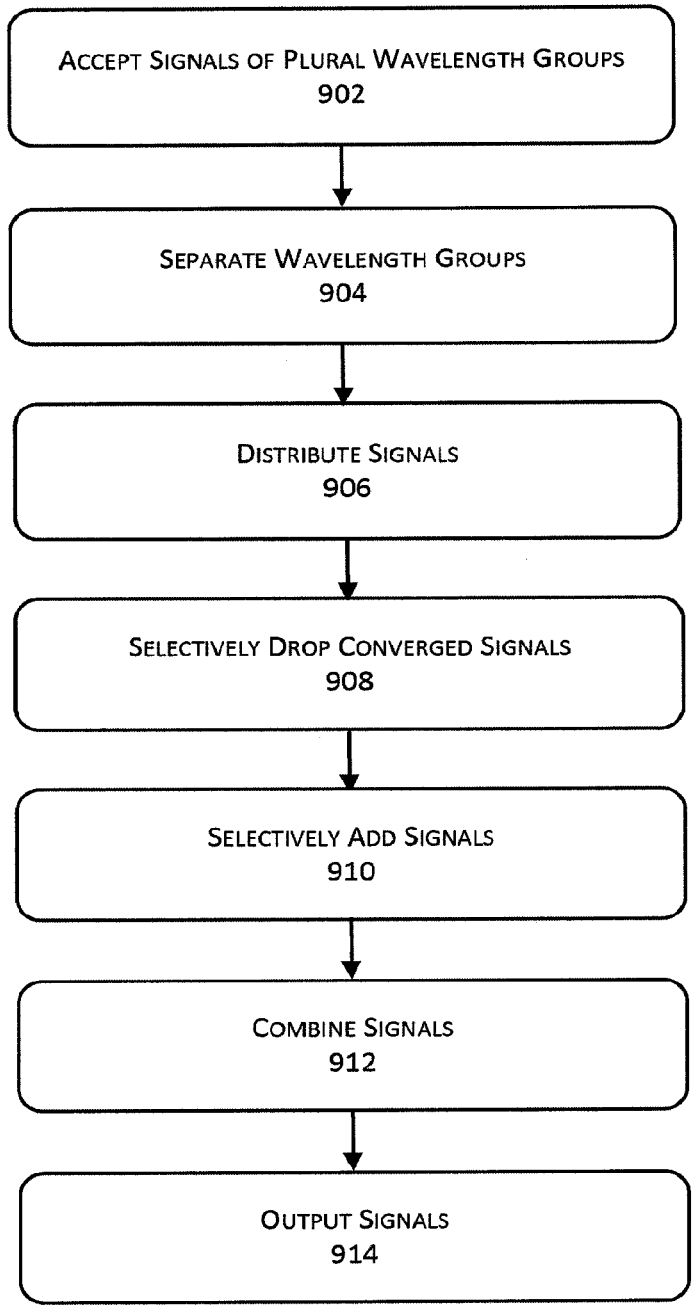
FIG. 9 shows another processing flow for at least an example apparatus in accordance with one or more embodiments of multi-band reconfigurable optical add-drop multiplexing with converged signal addition and removal.

FIG. 9 shows a processing flow 900 for at least an example apparatus implementing multi-band reconfigurable optical add-drop multiplexing with converged signal addition and removal.

Example processing flow 900 may include one or more operations, actions, or functions as illustrated by one or more of blocks 902, 904, 906, 908, 910, 912 and 914. Although illustrated as discrete blocks, various blocks may be divided into additional blocks, combined into fewer blocks, or eliminated, depending on the desired implementation. Further, in accordance with a first example embodiment, processing flow 900 is described in the context of apparatus 100, apparatus 200, apparatus 300, apparatus 400, apparatus 500, apparatus 600 and apparatus 700 on which multi-band reconfigurable optical add-drop multiplexing with converged signal addition and removal is achieved. Processing flow 900 may begin at block 902.

Block 902 (Accept Signals of Plural Wavelength Groups) may include accepting a plurality of input signals of a plurality of wavelengths belonging to a plurality of wavelength groups. A wavelength group may consist of contiguous wavelengths, or blocks of wavelength spectrum, for example a wavelength band. A wavelength group may consist of non-contiguous wavelengths, or blocks of wavelength spectrum, for example a set of odd or even interleaved wavelength channels. A wavelength group may consist of wavelengths, or blocks of wavelength spectrum, which include a combination of contiguous and non-contiguous blocks of wavelength spectrum. For example, as described above, one or more line input devices 180 may accept a plurality of input signals from one or more line inputs 182, the input signals belonging to a plurality of wavelength bands including the first wavelength band and the second wavelength band. The plurality of wavelength bands may include a plurality of wavelengths in C band and a plurality of wavelengths in L band.

Block 904 (Separate Wavelength Groups) may include separating a plurality of accepted input signals into sets of signals belonging to different wavelength groups. For example, as described above, each line input device 180 may output a plurality of the input signals as a plurality of bundles of input signals, including a bundle of first input signals 184 of a first wavelength band and a bundle of second input signals 186 of the second wavelength band. The separating may be executed by, for example, one or more interleaver filters.

Block 906 (Distribute Signals) may include distributing a plurality of input signals separated according to their wavelength groups. For example, as described above, distributing device 110 may accept one or more bundles of first input signals 184 and one or more bundles of second input signals 186, as well as any additional bundles of input signals corresponding to additional wavelength bands, from one or more line input devices 180. Distributing device 110 may further distribute at least some of the accepted signals into a plurality of distributed groups of signals.

Block 908 (Selectively Drop Converged Signals) may include selectively dropping one or more input signals of one or more of the plurality of wavelength groups among the accepted plurality of input signals. Signal drop is configurable such that a drop group of signals may include signals from any of the plurality of wavelength groups. In at least some implementations a drop group of signals may include signals from multiple wavelength groups. For example, as described above, signal add-drop device 130, 230, 330, 430, 530, 630 or 730 may drop one or more signals of one or more wavelength bands including the first wavelength band and the second wavelength band. In one embodiment, the accepting, the separating, and the selectively dropping are executed by a ROADM, and the separating is executed by an integrated array of two or more interleaver filters.

Block 910 (Selectively Add Signals) may include selectively adding one or more added signals of one or more of the plurality of wavelength groups. For example, as described above, signal add-drop device 130, 230, 330, 430, 530, 630 or 730 may provide one or more added signals of one or more wavelength bands including the first wavelength band and the second wavelength band.

Block 912 (Combine Signals) may include combining one or more pluralities of signals separated according to their wavelength groups. For example, as described above, combining device 120 may accept at least some of the distributed groups of signals from distributing device 110 and optionally one or more added signal groups. Combining device 120 may combine at least some of the accepted signals, and output one or more bundles of first output signals 194 and one or more bundles of second output signals 196, as well as any additional bundles of output signals corresponding to additional wavelength bands. Furthermore, one or more line output devices 190 may combine signals of different wavelength bands for output to one or more line outputs 192.

Block 914 (Output Signals) may include outputting signals which may include input signals and may include added signals. For example, as described above, one or more line output devices 190 may accept one or more bundles of first output signals 194 of the first wavelength band, and may further accept one or more bundles of second output signals 196 of the second wavelength band. The one or more line output devices 190 may provide a plurality of output signals to one or more line outputs 192.

Additional and Alternative Implementation Notes

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or any combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

For the purposes of this disclosure and the claims that follow, the terms "coupled" and "connected" may have been used to describe how various elements interface. Such described interfacing of various elements may be either direct or indirect.

I claim:

1. An apparatus, comprising:
a line input device configured to:
   accept a plurality of input signals of a plurality of wavelength groups,
   provide a plurality of the input signals of a first wavelength group as a bundle of first input signals, and
   provide a plurality of the input signals of a second wavelength group as a bundle of second input signals;
a distributing device, comprising first coupling elements, coupled to the line input device, configured to:
   accept the bundle of first input signals and the bundle of second input signals from the line input device,
   distribute at least some first input signals into distributed first groups of signals,
   distribute at least some second input signals into distributed second groups of signals, and
   provide the distributed first groups and second groups of signals;
a combining device coupled to the distributing device, configured to:
   accept at least some of the distributed first groups of signals, at least some of the distributed second groups of signals, and one or more added signals, and
   combine at least some of the distributed first groups of signals and the one or more added signals into a bundle of first output signals, and
   provide the bundle of first output signals;
a line output device coupled to the combining device, configured to:
   accept the bundle of first output signals from the combining device,
   accept a bundle of second output signals of the second wavelength group, and
   provide a plurality of output signals including signals of the bundle of first output signals and signals of the bundle of second output signals; and
a signal add-drop device coupled to the distributing device and the combining device, configured to:
   accept one or more distributed first groups of signals of the first wavelength group from one of the first coupling elements and another one of the first coupling elements of the distributing device,
   accept one or more distributed second groups of signals of the second wavelength group from the distributing device,
   receive one or more dropped signals at a receiver that is capable of receiving signals from more than one wavelength group, including the first and second wavelength groups, and
   provide at least one added signal to the combining device.

2. The apparatus of claim 1, wherein at least one of the first coupling elements includes:
an input port to accept the bundle of first input signals; and
a plurality of output ports to provide the distributed first groups of signals.

3. The apparatus of claim 2, wherein at least one of the first coupling elements comprises a wavelength selective switching element.

4. The apparatus of claim 2, wherein the at least one of the first coupling elements includes:
an input port to accept the bundle of second input signals; and
a plurality of output ports to provide distributed second groups of signals of the second wavelength band.

5. The apparatus of claim 1, wherein the combining device comprises a second coupling element that includes:
a plurality of input ports to accept the at least some of the distributed first groups of signals and the one or more added signals; and
an output port to provide the bundle of first output signals.

6. The apparatus of claim 5, wherein the second coupling element comprises a wavelength selective switching element.

7. The apparatus of claim 5, wherein the combining device comprises a plurality of second coupling elements and at least one of the plurality of second coupling elements includes:

a plurality of input ports to accept at least a portion of the plurality of the input signals of the second wavelength band and one or more added signals of the second wavelength band; and an output port to provide a bundle of second output signals that includes at least some of the signals accepted by the at least one of the plurality of second coupling elements.

8. The apparatus of claim 1, wherein the signal add-drop device comprises:
a third coupling element coupled to the distributing device, configured to:
accept one or more distributed first groups of signals of the first wavelength group, and
provide one or more drop groups of signals;
a fourth coupling element coupled to the combining device, configured to:
provide the at least one added signal of the first wavelength band, and
accept one or more add groups of signals;
a set of one or more receivers, each receiver configured to accept at least a portion of one of the one or more drop groups of signals from the third coupling element; and
a set of one or more transmitters, each transmitter configured to provide at least a portion of the one or more add groups of signals to the fourth coupling element.

9. The apparatus of claim 8, wherein the third coupling element is further configured to:
accept one or more distributed second groups of signals of the second wavelength band.

10. The apparatus of claim 8, wherein the fourth coupling element is further configured to:
provide at least one added signal of the second wavelength band.

11. The apparatus of claim 8, wherein at least one of the third coupling element and the fourth coupling element comprises a wavelength selective switching element.

12. The apparatus of claim 8, wherein the signal add-drop device further comprises:
a splitter coupled between the third coupling element and the set of one or more receivers, the splitter configured to:
accept a drop group of signals from the third coupling element, and
distribute the drop group of signals to the set of one or more receivers.

13. The apparatus of claim 12, wherein the signal add-drop device further comprises:
a band combiner coupled between the third coupling element and the splitter, configured to:
accept a drop group of signals from the third coupling element,
accept an additional drop group of signals of the second wavelength band, and
provide a combined drop group of signals to the splitter.

14. The apparatus of claim 8, wherein the signal add-drop device further comprises:
a combiner coupled between the fourth coupling element and the set of one or more transmitters, configured to:
accept signals from the set of one or more transmitters, and
provide an add group of signals to the fourth coupling element.

15. The apparatus of claim 14, wherein the signal add-drop device further comprises:
a band splitter coupled between the fourth coupling element and the combiner, configured to:
accept an add group of signals from the combiner,
provide an add group of signals of the first wavelength band to the fourth coupling element, and
provide an additional add group of signals of the second wavelength band.

16. The apparatus of claim 8, wherein the signal add-drop device further comprises:
a switching element that includes:
a plurality of input ports configured to:
accept the one or more drop groups of signals from the third coupling element, and
a plurality of output ports configured to:
selectively provide at least a portion of the one or more drop groups of signals to the set of one or more receivers.

17. The apparatus of claim 16, wherein the switching element is further configured to:
accept one or more additional drop groups of signals of the second wavelength band; and
selectively provide at least a portion of the one or more additional drop groups of signals to the set of one or more receivers.

18. The apparatus of claim 16, wherein the switching element comprises an optical cross-connect.

19. The apparatus of claim 8, wherein the signal add-drop device further comprises:
a switching element that includes:
a plurality of input ports configured to:
accept signals from the set of one or more transmitters; and
a plurality of output ports configured to:
selectively provide at least a portion of the signals from the set of one or more transmitters to the fourth coupling element.

20. The apparatus of claim 19, wherein the switching element is further configured to:
accept one or more signals of the second wavelength band from the set of one or more transmitters; and
selectively provide one or more additional add groups of signals of the second wavelength band.

21. The apparatus of claim 19, wherein the switching element comprises an optical cross-connect.

22. A method of multi-band reconfigurable optical add-drop multiplexing, comprising:
accepting a plurality of input signals that belong to a plurality of wavelength groups from a combination of contiguous and non-contiguous blocks of wavelength spectrum;
separating the accepted plurality of input signals into sets of signals, each set belonging to one of the plurality of wavelength groups including of a first wavelength group and a second wavelength group;
distributing, via a distributing device comprising first coupling elements, the separated input signals into a plurality of distributed groups of signals;
accepting one or more distributed groups of signals of the first wavelength group from one of the first coupling element and another one of the first coupling element of the distributing device; and
selectively dropping one or more groups of signals, each group of signals configurable to include signals belonging to more than one of the wavelength groups.

23. The method of claim 22, wherein the plurality of wavelength groups comprises a plurality of frequencies in C band and a plurality of frequencies in L band.

24. The method of claim 22 further comprising:
selectively adding one or more added signals of one or more of the wavelength groups; and providing the added one or more added signals as output signals.

25. The method of claim 22, wherein the separating is executed by one or more band filters.

26. The method of claim 25, wherein the accepting, the separating, and the selectively dropping are executed by a reconfigurable optical add-drop multiplexer (ROADM), and wherein the separating is executed by an integrated array of two or more band filters.

27. The method of claim 22, wherein the separating is executed by one or more interleaver filters.

28. The method of claim 27, wherein the accepting, the separating, and the selectively dropping are executed by a reconfigurable optical add-drop multiplexer (ROADM), and wherein the separating is executed by an integrated array of two or more interleaver filters.

* * * * *